United States Patent Office 3,394,118
Patented July 23, 1968

3,394,118
POLYMERIZATION CATALYST AND PROCESS
John Boor, Jr., El Cerrito, Calif., assignor to Shell Oil Company, New York, N.Y., a corporation of Delaware
No Drawing. Filed Sept. 26, 1963, Ser. No. 311,617
12 Claims. (Cl. 260—93.7)

This invention relates to a new and improved method for the polymerization of alpha-monoolefins. More particularly, it relates to the use of novel catalyst-modifying components in the stereoregular polymerization of olefins to produce solid polyolefins, such as polypropylene.

It is now well known that solid, linear polymers of alpha-monoolefins may be catalytically prepared at low temperatures and pressures. Such processes are conducted at temperatures ranging from about room temperature to about 150° C. and pressures below about 500 pounds per square inch. Broadly, suitable catalysts are formed from a transition metal compound and a metal-organic compound capable of acting as a reducing agent.

A variety of results can be obtained in the low pressure polymerization of a given alpha-olefin with catalysts comprising a transition metal compound and a reducing agent, depending on the choice of the compound used as reducing agent, the choice of transition metal compound, and the choice of catalyst component ratios and reaction conditions. The specific effects of variations in catalyst composition are often unpredictable; relatively small changes can lead to widely different reaction rates and types of products.

Solid alpha-olefin polymers produced with the best of the known low-pressure polymerization catalysts according to known methods are characterized by a high degree of linearity and significant crystallizability of the polymer. A particularly useful olefin polymer is polypropylene. Although this invention can be utilized in producing various other polyolefins, the invention is of particular advantage in the production of polypropylene, and the discussion therefore will be directed mainly to propylene polymerization.

A large number of polymerization catalysts based on transition metal compounds have been disclosed. A summary of the state of the art in 1959 is found in "Linear and Stereoregular Addition Polymers" by Gaylord et al., Interscience Publishers, Inc., New York. In practice, however, the only catalyst systems known to have achieved commercial success for production of highly stereoregular polypropylene are based on a chloride of titanium in a valance state less than four, used with aluminum alkyl or aluminum alkyl halide.

One of the problems associated with the use of the best of the known stereoregulating polymerization catalysts is that they tend to produce polymers of molecular weights that are too high for commercial processing methods such as molding and extrusion. Several additives have been suggested for the purpose of controlling molecular weight, but at least some of those found to be effective have the undesired effect of also reducing stereoregularity of the polymer or reaction rate or both. Another known means of reducing the molecular weight of stereoregular polymers in these polymerization processes is to carry out the reaction at a relatively high temperature, e.g., above 80° C. This again results in great loss in stereoregularity of the polymer.

It has now been found that catalysts which have not been considered practically useful because they produce polymers of undesirably low stereoregularity can be modified by addition of certain hydrocarbon additives which improve stereoregulating ability. A particular group of catalysts in this category are those which contain zinc dialkyl or cadmium dialkyl as all or part of the metal alkyl component. These catalysts are of special advantage in that controlled addition of zinc dialkyl or cadmium dialkyl results in controlled reduction of molecular weight of the polymer.

It has also been found that the additives of this invention permit the production of highly stereoregular polymer at elevated temperatures with catalysts which would produce polymer of low stereoregularity at the same conditions in the absence of said additives.

This invention thus provides useful alternative methods of controlling molecular weight in the polymerization of alpha-monoolefins to highly stereoregular polymers, and it increases the choice of available catalysts for conversion of alpha-monoolefins to highly stereoregular polymers.

It is accordingly one of the main objects of this invention to provide catalyst-modifying additives which result in a substantial increase in the stereoregularity of alpha-monoolefin polymers produced with transition metal halide catalysts of normally relatively low stereoregulating activity.

Another important object of this invention is to provide catalyst-modifying additives which result in a substantial increase in the stereoregularity of polymer produced at unconventionally high temperatures, e.g., about 115° C., with a catalyst which is highly stereoregulating at conventional temperatures in the range from 25° C. to 80° C. but much less stereoregulating at higher temperatures in the absence of said additives.

Other objects will appear from the following description of the invention.

This invention is based on the surprising discovery of the effectiveness of a group of hydrocarbon compounds in improving stereoregulating activity of transition metal compound catalysts which otherwise have a relatively low stereoregulating activity, and in improving the stereoregulating activity of good catalysts at elevated temperatures at which they normally produce polymer of lower stereoregularity. The most effective hydrocarbon additives of this invention have the common characteristics of containing carbocyclic rings and of absorbing light in the visible region above about 6500 A. when in solution in a colorless hydrocarbon solvent. These numbers refer to highest wave lengths when more than one is absorbed.

A particularly unusual chemical aspect of the additives of this invention is that they apparently do not react with aluminum or zinc alkyl compounds at the polymerization conditions. They differ in this respect from other organic compounds, such as various Lewis bases, that have been suggested as catalyst-modifying additives.

In one embodiment, this invention comprises a polymerization process in which alpha-monoolefins are polymerized under conditions conductive to steroregular polymerization by contact with a catalyst comprising a combination of transition metal compound and organometallic compound, the combination having a stereoregulating activity substantially less than that of the best of the known catalysts, together with a catalyst-modifying additive which results in bringing up the stereoregulating activity of said combination to equal or exceed that of said best catalysts.

In another embodiment, this invention comprises a polymerization process in which alpha-monoolefins are polymerized at unconventionally high temperatures by contact with a polymerization catalyst which has satisfactory stereoregulating activity at conventional polymerization temperatures but not at said higher temperatures, together with a catalyst-modifying additive which results in bringing up the stereoregulating activity of the catalyst at the prevailing higher temperature to about that normally obtained at said conventional temperatures.

In a specific preferred embodiment, this invention comprises a polymerization process in which propylene is polymerized with a catalyst comprising a catalytically active form of titanium trichloride, an aluminum alkyl compound, a zinc dialkyl, and one of said catalyst modifying additives of this invention.

In another embodiment, this invention comprises a polymerization process in which an alpha-monoolefin such as propylene is polymerized at conditions resulting in a highly crystallizable polymer which remains in solution, by contact with a catalyst of titanium trichloride or similar transition metal compound and aluminum alkyl, modified by addition of one of said catalyst-modifying additives of this invention. It has not been possible heretofore to produce highly crystallizable polypropylene in a solution process at practical reaction conditions.

In another embodiment, this invention comprises a polymerization process in which an alpha-monoolefin such as propylene is polymerized by contact with a catalyst of titanium trichloride or similar transition metal compound in the presence of a relatively large portion of zinc dialkyl, replacing either all or part of the conventional aluminum alkyl, and of one said catalyst-modifying additives of this invention. The use of zinc dialkyl results in polymer of controlled lowered molecular weight. In the absence of a catalyst-modifying additive the polymer would have only a low stereoregularity. Proper use of an additive of this invention can result in polymer having as high or higher stereoregularity than the best catalysts heretofore used.

In a further embodiment, this invention comprises the novel catalyst composition consisting of the reaction product of a transition metal halide and a metal-organic reducing compound, said reaction product having a relatively low stereoregulating ability, and of a catalyst-modifying carbocyclic organic additive selected from the group consisting of (a) dihydrocarbyl fulvenes in which each of the two hydrocarbon substituents has from 1 to 12 carbon atoms and said hydrocarbon substituents are alkyl groups, cycloalkyl groups, alkyl-substituted cycloalkyl groups, phenyl groups or alkyl-substituted phenyl groups; and (b) azulene, and azulene substituted with substituents from the groups consisting of alkyl, aryl, halo-alkyl and haloaryl groups, having from 1 to 12 carbon atoms.

The use of the catalysts of this invention results in linear polymers of alpha-monoolefins of two or more carbon atoms. In general, suitable monomers for the production of linear polyolefins are compounds having the formula $RCH=CH_2$ wherein R is hydrogen or an aliphatic, cycloaliphatic or aromatic radical containing from 1 to 20 carbon atoms. Monomers in which R is an unbranched $C_4$ or higher alkyl group generally result in polymers that are not crystallizable. Particularly suitable olefins for the production of crystallizable polymers are propylene, 1-butene, 3-methyl-1-butene, 4-methyl-1-pentene, 4-methyl-1-hexene and the like, which are known to produce stereoregular crystalline polymers. Other monomers which can be polymerized with such catalysts include styrene, allylbenzene, 4-phenyl-1-butene, 1-allylnaphthalene, 2-allyl-toluene, vinyl cyclohexane, 1-alkenes of 5 and more carbon atoms, and cyclohexyl and aryl substituted 1-alkenes. The catalysts may be used for the polymerization of mixtures of monomers when a crystalline product is possible and is desired.

Polypropylene is typical of alpha-olefin polymers which can exist in highly stereoregular form. Solid polypropylenes of highly regular structure, such as isotatic and syndiotactic polypropylenes, are crystallizable. Under suitable conditions of solidification they obtain a high degree of crystallinity as determined by X-ray analysis or comparable methods. In general, polypropylene having a crystallinity of at least about 63% as measured by X-ray analysis is considered satisfactory for commercial purposes. Such polypropylene usually contains only a very small proportion of material which is extractable in boiling hydrocarbons, such as gasoline boiling range hydrocarbons. Typically, the proportion of highly crystalline polypropylene which is extractable in boiling heptane or isooctane is less than 10% and usually less than 5%.

Conventional crystalline polypropylene has a viscosity average molecular weight of at least about 40,000 and generally between 100,000 and 1,200,000. For convenience, the molecular weight is usually expressed in terms of intrinsic viscosity. The intrinsic viscosity of polypropylene, measured in Decalin at 150° C., is generally between 1.0 and 6 dl./g. but may be as low as 0.5 or less and as high as 10 or more.

One essential component of the catalyst compositions of this invention is a halide or alkoxyhalide of a transition metal selected from Groups 4b, 5b, 6b or 8 of the Periodic Table of the Elements, as illustrated on pages 448 and 449 Handbook of Chemistry and Physics, The Chemical Rubber Publishing Corp., 44th Edition, 1962. in the active catalyst, the transition metal is at a valence below its maximum. Among the halogens the order of preference runs from chlorides to bromides to iodides to fluorides.

Titanium trichloride is particularly preferred and especially the gamma form thereof. With a highly effective aluminum alkyl, this leads to the most effective catalysts, whose stereoregulating ability at elevated temperatures is improved according to this invention. An active form of titanium trichloride is prepared by reducing titanium tetrachloride by reaction with an aluminum trialkyl, as described, for example, in U.S. 2,971,925 to Winkler et al. Activated forms of alpha and gamma titanium trichloride are sometimes referred to as delta titanium trichloride. The delta form, as well as the beta form of titanium trichloride, is also suitable for use in the catalysts of this invention. These active forms of titanium trichloride generally may be considered as molecular alloys of $TiCl_3$ and $AlCl_3$ of varying compositions. Both the $\beta$-$TiCl_3$ and $\gamma$-$TiCl_3$ can be produced by reacting 1 mol of $TiCl_4$ with ⅓ mol aluminum triethyl. Brown $\beta$-$TiCl_3$ results when the reaction is carried out at relatively low temperature, e.g., 25° C.; purple $\gamma$-$TiCl_3$ is produced at a higher temperature, e.g., 160° C. Other catalytically active forms of $TiCl_3$ are commercially produced by reduction of $TiCl_4$ by means of aluminum metal, or with hydrogen, followed by an activating treatment.

Other suitable titanium compounds include butoxy titanium dichloride and ethoxy titanium dichloride.

Another preferred catalyst comprises the active form of vanadium trichloride.

Similar compounds of zirconium and other transition metals can be used, such as their trichlorides, tribromides, and alkoxy dichlorides.

The reducing component of the catalyst is an organometallic compound of magnesium, zinc, cadmium, aluminum, gallium or indium, having a metal-to-carbon bond.

Suitable aluminum compounds are those having the formula RR'AlX wherein R and R' each is selected from the group consisting of hydrogen and hydrocarbon and X is selected from the group consisting of hydrogen, halogen, the residue of a secondary amine, amide, mercaptan, thiophenol, carboxylic acid and sulfonic acid. Suitable cadmium and zinc compounds are those of formula RR'Cd or RR'Zn in which each R is a saturated hydrocarbon group of from 1 to 10 carbon atoms, e.g., an alkyl, cycloalkyl, aryl or alkaryl group. Usually R and R' are identical, but they may be different if desired. Zinc or cadmium diethyl and di-n-propyl are particularly preferred. R and R' may also be isopropyl, isobutyl, isoamyl, phenyl, tolyl, and the like.

Preferred for practical purposes are, among the aluminum alkyl compounds, trialkyls and dialkyl monohalides wherein the alkyl groups have from one to ten carbon atoms, zinc dialkyls having alkyl groups of from one to ten carbon atoms, and mixtures thereof. Cadmium dialkyls are also of some practical interest. The preferred alkyl group in each type is the ethyl group, but compounds having n-propyl, isopropyl, n-butyl, isobutyl, n-octyl or 2-ethylhexyl groups, etc., may be employed. To produce catalysts which are highly stereospecific in the absence of additives of this invention, aluminum dialkyl halides are preferred; aluminum diethyl chloride is most preferred. Instead of alkyl groups, suitable organometallic compounds may also have cycloalkyl, aryl, alkaryl or aralkyl groups.

The following Table 1 lists compounds which have been found to be effective sterospecificity promoting catalyst components according to this invention, as well as some similar but ineffective compounds. All are carbocyclic hydrocarbons. All effective compounds are carbocyclic hydrocarbons which absorb light in the visible region of the spectrum when in hydrocarbon solution, i.e., their solutions are colored. The table shows for each compound name and structural formula, color of hydrocarbon solution and, for several compounds, the longest wave length at which the solution absorbs light (λ maximum). Effectiveness in improving stereoregularity is rated on the following arbitrary scale:

0—substantially ineffective
1—moderately effective
2—effective
3—highly effective.

TABLE 1

| Compound | Structural Formula | Color of Toluene Solution | λ Max., A. | Effectiveness |
|---|---|---|---|---|
| 1 Benzene | | Colorless | 2,630 | 0 |
| 2 Acenaphthene | | do | <3,000 | 0 |
| 3 Fluorene | | do | 3,800 | 0 |
| 4 Pyrene | | | | 0 |
| 5 Anthracene | | | | 1 |
| 6 Naphthacene | | Yellow | 4,740 | *1 |
| 7 Dimethylfulvene | | Orange | | 2 |
| 8 Diphenylfulvene | | do | | 2 |
| 9 Azulene | | Blue | >6,500 | 3 |
| 10 4,6,8-trimethylazulene | | do | >6,500 | 3 |

TABLE 1—Continued

| Compound | Structural Formula | Color of Toluene Solution | λ Max., A. | Effectiveness |
|---|---|---|---|---|
| 11  Guaiazulene | 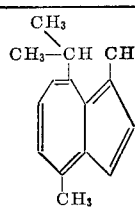 | Blue | >6,500 | 3 | a Limited by low hydrocarbon solubility.

Other compounds suitable as additives according to this invention are (a) dihydrocarbyl fulvenes in which the two hydrocarbon substituents are alkyl, cycloalkyl or alkyl-substituted cycloalkyl or phenyl groups, particularly those in which said hydrocarbyl groups have from 2 to 12 carbon atoms each; and (b) substituted azulenes, particularly where the substituents are alkyl, aryl, halo-alkyl or haloaryl groups, preferably of 1 to 12 carbon atoms.

The catalysts of this invention may be prepared by combining the ingredients in any desired order and contacting the combined ingredients with the monomer to be polymerized. In a batch or semi-batch method, the catalyst ingredients are placed into a suitable hydrocarbon diluent in the reactor and monomer feed is then introduced. Additional catalyst components may be added during the course of the reaction. In continuous processes catalyst ingredients may be fed separately or in combination to the reactor as required during the course of the process.

Polymerization of alpha-monoolefins according to this invention and recovery of polymer are suitably carried out according to methods known to be suitable for low pressure olefin polymerization processes of the prior art. This includes batchwise, semi-batchwise or continuous operations under conditions that exclude air and other atmospheric impurities, particularly moisture.

The reaction temperature is maintained between 0° and 150° C. As explained above, the additives of this invention permit catalysts to be used at relatively high reaction temperatures without the loss of stereoregulating effectiveness which is otherwise observed. When the additives of this invention are employed for this purpose, temperatures in the higher part of the above range, i.e., from 80° to 120° C., are preferred. The use of higher temperatures is accompanied by a reduction in molecular weight of the polymer, which may at times be a desired result. When otherwise conventional reaction conditions are desired, temperatures between 40° and 70° C. are preferred.

The reaction pressure is not critical. It is usually only sufficiently high to maintain liquid phase reaction conditions; it may be autogenic pressure, which will vary depending upon the components of the reaction mixture and the temperature, or it may be higher, e.g., up to 1000 p.s.i. High pressures are suitably obtained by pressuring with monomer gas or with an inert gas.

In batch operations the polymerization time can be varied as desired; it may vary, for example from a few minutes to several hours. Polymerization in batch processes may be terminated when monomer is no longer absorbed or earlier, if desired, e.g., if the reaction mixture becomes too viscous. In continuous operations the polymerization mixture passes through a reactor of any suitable design. The polymerization reactions in such cases are suitably adjusted by varying the residence time. Residence times vary with the type of reactor system and range, for example, from 10 to 15 minutes to 2 or more hours.

In a suitable continuous operation, fresh feed, diluent and catalyst are continuously introduced into an agitated reaction zone and reaction mixture slurry is withdrawn from the zone for removal and recovery of polymer. Heat of reaction may be withdrawn by indirect heat exchange or by evaporation of diluent and/or monomer in the reaction zone.

After the polymerization is complete, polymer is recovered from a slurry of the solid polymer in reaction diluent. A simple filtration is adequate to separate polymer from diluent. Other means for separating polymer from diluent may be employed. The polymer may be treated, separately or while slurried in the reaction mixture, in order to separate catalyst residues. Such treatment may be with alcohols such as methanol, ethanol, or isopropanol, with acidified alcohols, or with other similar polar liquids.

The concentration of monomer in the reaction mixture may vary upward from 5 percent by weight of the reaction mixture, depending on the conditions employed; the range from 20 to 80 percent by weight is preferred.

Catalysts are suitably used in a concentration ranging from about 0.1 to about 2% by weight based on the weight of the reaction mixture. The prefered molar ratios of organometallic reducing compound to transition metal halide or alkoxyhalide are in the range from 0.5:1 to 2:1, although higher ratios, e.g., up to 10:1, may be employed. When zinc or cadmium dialkyl is to be used in combination with an aluminum alkyl, i.e., as a molecular weight regulator, it is suitably added in a controlled amount in the range from 0.001 to 0.5 mol per mol of aluminum alkyl. The molar ratio of hydrocarbon additive to transition metal compound may be as low as 0.02:1 or as high as 1:1 or somewhat higher. The preferred ratios are within the range of 0.1:1 to 0.8:1.

It is preferred to carry out the reaction according to this invention in a suitable diluent which is liquid under the conditions of reaction and relatively inert. The diluent may have the same number of carbon atoms per molecule as the olefin reactant or it may be in a different boiling range. Preferred as diluents are alkane and cycloalkane hydrocarbons. Suitable diluents are, for example, propane, butane, isobutane, cyclohexane, methylcyclohexane, Tetralin, Decalin, or saturated hydrocarbon mixtures in the gasoline boiling range or diesel oil boiling range. Aromatic hydrocarbons such as benzene, toluene, isopropylbenzene, xylene, or the like, or halogenated aromatic compounds such as chlorobenzene, or orthodichlorobenzene and the like may also be employed, if desired.

Although it is possible to use technical grades of olefins and diluents, containing the normal impurities present in such grades, it is much preferred to use purified olefin feed and purified diluents which are relatively free of impurities. Processes for purifying olefin reactants and diluents for low pressure polymerization processes are now well known to the art and are equally suitable for preparing feeds and diluents for use in processes of this invention.

The following examples illustrate various aspects of this invention. They are provided for the purpose of illustrating the invention and not by way of limitation.

Unless otherwise stated, each polymerization run of the examples was carried out as follows:

Known amounts of solvent and catalyst were added to a carefully washed and dried pressure resistant eight ounce glass bottle, provided with means to permit escape of excess gas without possibility of atmospheric contamination. The bottle was cooled to $-30°$ to $-40°$ C. and a desired amount of olefin condensed into the reaction charge. The bottle was then sealed with a pressure-tight cap and placed in an agitated temperature-controlled oil bath for the desired time. Upon completion of the polymerization the reaction mixture was added to isopropyl alcohol, washed several times with fresh isopropyl alcohol, agitated in Waring Blendors, washed again, combined with a suitable conventional antioxidant, and dried under vacuum at $50°$ C. The person skilled in the art of olefin polymerization will be readily able to modify this laboratory procedure to adapt it to commercial practice, by reference, if needed, to numerous patents and publications describing olefin polymerization on a commercial scale, as reviewed, for example, in "Linear and Stereoregular Addition Polymers" by Gaylord and Mark, Interscience Publishers, Inc., New York, 1959.

Unless otherwise stated, the index of stereoregularity of the polymers is the ratio of infrared absorption $$\frac{A_{10.02\mu}}{A_{10.28\mu}}$$

measured on compression molded films of 0.0015 inch thickness.

This ratio has been found to correlate well with isotacticity as measured by other means, e.g., by X-ray diffraction. The correlation of $$\frac{A_{10.02\mu}}{A_{10.28\mu}}$$

with crystallinity of polypropylene as determined by X-ray density methods is set out below.

| $\frac{A_{10.02\mu}}{A_{10.28\mu}}$ | Approximate equivalent percent crystallinity |
|---|---|
| 0.60 | 30 |
| 0.70 | 42 |
| 0.80 | 54 |
| 0.90 | 66 |
| 0.92 | 69 |
| 0.94 | 72 |
| 0.96 | 75 |
| 0.98 | 78 |

The intrinsic viscosity of the polymers is determined from measurements of their specific viscosity in Decalin at $150°$ C.

Examples 1–15

Polymerization runs are carried out as described above with 100 ml. of solvent;

Polymerization runs are carried out as described above with 100 ml. of solvent; 0.75 millimole (mmole of $\gamma$-TiCl$_3$ (prepared from AlEt$_3$ and TiCl$_4$ at $160°$ C. and containing a molar ratio of Al:Ti:Cl of about 0.9:3:10); 4.2 mmole of zinc diethyl and 24 g. of propylene. The reaction mixture is held 20 hours at $50°$ C. The results are shown in Table 2. Examples 1 and 2 are control runs without additive. Examples 3–6 illustrate use of several related compounds, which are not substantially effective for increasing stereoregularity.

TABLE 2

| Example: | Solvent | Polynuclear Compound | Mmole | Conv., Percent | $\frac{A_{10.02\mu}}{A_{10.28\mu}}$ | Increase in IR Ratio | Effectiveness Rating |
|---|---|---|---|---|---|---|---|
| 1 | Heptane | None | | 66 | .65 | (¹) | |
| 2 | Toluene | do | | 63 | .63 | (¹) | |
| 3 | do | Fluorene | 14 | 72 | .65 | .02 | 0 |
| 4 | Heptane | Acenaphthene | 14 | 79 | .64 | −.01 | 0 |
| 5 | do | do | 28 | 77 | .65 | .00 | 0 |
| 6 | Toluene | Pyrene | 14 | 78 | .66 | .01 | 0 |
| 7 | do | Azulene | 0.1 | 49 | .91 | .28 | 3 |
| 8 | Heptane | do | 0.1 | 52 | .89 | .24 | 3 |
| 9 | do | do | 0.5 | 50 | .93 | .28 | 3 |
| 10 | do | do | 1.5 | 58 | .93 | .28 | 3 |
| 11 | Toluene | 4,6,8-trimethylazulene | 0.1 | 30 | .87 | .24 | 3 |
| 12 | do | Dimethylfulvene | 0.1 | 50 | .77 | .14 | 2 |
| 13 | Heptane | do | 2.0 | 57 | .94 | .29 | 2 |
| 14 | Toluene | Diphenylfulvene | 0.1 | 48 | .76 | .13 | 2 |
| 15 | Heptane | do | 2.0 | 57 | .93 | .28 | 2 |

¹ Control.

Examples 16–33

Polymerization runs are carried out as described above, with 100 ml. of heptane solvent; various amounts of various transition metal halides; 3 mmoles of various metal alkyls; and specified amounts of azulene. The reaction is conducted for 50 minutes at $60°$ C., except for Examples 28 and 29, which are conducted at $80°$ C. Details of the reaction mixture components and of the results are shown in Table 3.

TABLE 3

| Example No. | Metal Alkyl | Catalyst | Catalyst, mmole | Azulene, mmole | Reaction Temp., °C. | Percent Conv. | $\frac{A_{10.02}}{A_{10.28}}$ | Increase in IR Ratio |
|---|---|---|---|---|---|---|---|---|
| 16 | AlEt$_3$ | VCl$_3$ | 1.3 | 4 | 60 | 95 | .70 | .10 |
| 17 | AlEt$_3$ | VCl$_3$ | 1.3 | 0 | 60 | 83 | .60 | (ᵃ) |
| 18 | AlEt$_3$ | $\beta$-TiCl$_3$ ᵇ | 0.65 | 4 | 60 | 21 | .84 | .15 |
| 19 | AlEt$_3$ | $\beta$-TiCl$_3$ ᵇ | 0.65 | 0 | 60 | 92 | .69 | (ᵃ) |
| 20 | AlEt$_3$ | $\gamma$-TiCl$_3$ ᶜ | 0.65 | 4 | 60 | 74 | .86 | .12 |
| 21 | AlEt$_3$ | $\gamma$-TiCl$_3$ ᶜ | 0.65 | 0 | 60 | 95 | .74 | (ᵃ) |
| 22 | AlEt$_2$F | $\gamma$-TiCl$_3$ ᶜ | 0.65 | 4 | 60 | 58 | .87 | .21 |
| 23 | AlEt$_2$F | $\gamma$-TiCl$_3$ ᶜ | 0.65 | 0 | 60 | 96 | .66 | (ᵃ) |
| 24 | AlEt$_2$Cl | $\beta$-TiCl$_3$ ᵇ | 0.65 | 1.5 | 60 | 21 | .90 | .02 |
| 25 | AlEt$_2$Cl | $\beta$-TiCl$_3$ ᵇ | 0.65 | 0.5 | 60 | 33 | .90 | .02 |
| 26 | AlEt$_2$Cl | $\beta$-TiCl$_3$ ᵇ | 0.65 | 0.1 | 60 | 50 | .88 | 0 |
| 27 | AlEt$_2$Cl | $\beta$-TiCl$_3$ ᵇ | 0.65 | 0 | 60 | 68 | .88 | (ᵃ) |
| 28 | AlEt$_2$Cl | $\beta$-TiCl$_3$ ᵇ | | 0.5 | 80 | 22 | .90 | .06 |
| 29 | AlEt$_2$Cl | $\beta$-TiCl$_3$ ᵇ | | 0 | 80 | 41 | .84 | (ᵃ) |
| 30 | AlEt$_2$Cl | $\gamma$-TiCl$_3$ ᶜ | 0.65 | 1.5 | 60 | 74 | .91 | .01 |
| 31 | AlEt$_2$Cl | $\gamma$-TiCl$_3$ ᶜ | 0.65 | 0.5 | 60 | 79 | .91 | .01 |
| 32 | AlEt$_2$Cl | $\gamma$-TiCl$_3$ ᶜ | 0.65 | 0.1 | 60 | 83 | .90 | 0 |
| 33 | AlEt$_2$Cl | $\gamma$-TiCl$_3$ ᶜ | 0.65 | 0 | 60 | 89 | .90 | (ᵃ) |

ᵃ Control—Reference experiment with which comparison was made.
ᵇ Prepared by reacting AlEt$_3$ and TiCl$_4$ at $25°$ C.
ᶜ Prepared by reacting AlEt$_3$ and TiCl$_4$ at $160°$ C.

Examples 34–42

Polymerization runs are carried out as described above, with 100 ml. heptane solvent; 0.5 mmole of various titanium trichloride catalysts; 1.5 mmoles of $AlEt_2Cl$; various amounts of zinc diethyl; and various amounts of various hydrocarbon additives. The runs are conducted for 30 minutes at 80° C. Details of the reaction mixture components and of the results are shown in Table 4.

Examples 43–54

Polymerization runs are carried out as described above, with 150 ml. of heptane solvent (unless otherwise stated); various amounts of $\gamma$-$TiCl_3$ catalyst prepared from $AlEt_3$ and $TiCl_3$ at 160° C.; various amounts of $AlEt_2Cl$; and various amounts of hydrocarbon additives. A propylene pressure of 140 p.s.i.g. is maintained. Details of the reaction mixture components, conditions and results are shown in Table 5.

TABLE 4

| Example No. | Titanium Chloride | Mmole $ZnEt_2$ | Additive | Mmole | Percent Conv. | $\dfrac{A_{10.02}}{A_{10.28}}$ | Increase in IR Ratio | I.V. |
| --- | --- | --- | --- | --- | --- | --- | --- | --- |
| 34 | $\gamma$-$TiCl_3$ | 0.5 | None | | 58 | .85 | (¹) | .60 |
| 35 | $\gamma$-$TiCl_3$ | 0.5 | Azulene | 0.5 | 33 | .98 | .13 | .89 |
| 36 | $\gamma$-$TiCl_3$ | 1.0 | None | | 52 | .78 | (¹) | .57 |
| 37 | $\gamma$-$TiCl_3$ | 1.0 | Azulene | 0.5 | 32 | .98 | .20 | 1.08 |
| 38 | $\gamma$-$TiCl_3$ | 2.0 | None | | 48 | .66 | (¹) | .69 |
| 39 | $\gamma$-$TiCl_3$ | 2.0 | Azulene | 0.5 | 29 | .96 | .30 | 1.30 |
| 40 | $\gamma$-$TiCl_3$ | 1.5 | None | | 47 | .61 | (¹) | .71 |
| 41 | $\gamma$-$TiCl_3$ | 1.5 | Dimethylfulvene | 0.85 | 4 | .96 | .35 | 1.8 |
| 42 | $\gamma$-$TiCl_3$ | 0 | None | | 80 | .90 | | 2.0 |

¹ Control.

TABLE 5

| Example No. | Mmole, $\gamma$-$TiCl_3$ | Mmole, $AlEt_2Cl$ | Additive | Mmole | Temp., ° C. | Time, min. | Additive:Ti mole ratio | Polymer Yield, g. | $\dfrac{A_{10.02\mu}}{A_{10.28\mu}}$ | Increase in IR Ratio | I.V. | Change in I.V. |
| --- | --- | --- | --- | --- | --- | --- | --- | --- | --- | --- | --- | --- |
| 43 ᵃ | 0.65 | 3 | None | 0 | 60 | 50 | | ᵇ(89) | 0.90 | | | |
| 44 ᵃ | 0.65 | 3 | Azulene | 0.1 | 60 | 50 | | ᵇ(83) | 0.90 | 0 | | |
| 45 ᵃ | | | None | | 80 | | | ᵇ(80) | 0.90 | 0 | 2.0 | |
| 46 | 0.25 | 2.25 | ....do.... | 0 | 115 | 30 | 0 | 20.7 | 0.68 | (ᵈ) | 1.1 | (ᵈ) |
| 47 | 0.25 | 2.25 | Azulene | 1.00 | 115 | 30 | 4.0 | 5.6 | 0.94 | 0.26 | 2.1 | +1.0 |
| 48 | 0.25 | 2.25 | ....do.... | 0.50 | 115 | 30 | 2.0 | 5.2 | 0.92 | 0.24 | 1.9 | +0.8 |
| 49 | 0.25 | 2.25 | ....do.... | 0.25 | 115 | 30 | 1.0 | 8.1 | 0.90 | 0.22 | 1.5 | +0.4 |
| 50 | 0.25 | 2.25 | ....do.... | 0.05 | 115 | 20 | 0.2 | 6.1 | 0.90 | 0.22 | 1.4 | +0.3 |
| 51 | 0.25 | 2.25 | ....do.... | 0.005 | 115 | 30 | 0.02 | 9.5 | 0.70 | 0.02 | (ᵉ) | |
| 52 | 0.25 | 2.25 | Dimethylfulvene | 0.85 | 115 | 30 | 3.4 | 4.1 | 0.74 | 0.08 | 1.0 | −0.1 |
| 53 | 0.25 | 2.25 | Azulene | 0.25 | 115 | 7 | 1.0 | 1.5 | 0.94 | 0.26 | 0.71 | −0.4 |
| 54 ᶜ | 0.25 | 2.25 | ....do.... | 0.25 | 115 | 30 | 1.0 | 6.0 | 0.93 | 0.25 | | |

ᵃ These experiments performed in 100 ml. heptane.  ᵇ Percent conversion.  ᶜ This experiment was performed in cyclohexane as solvent. Since isotactic polypropylene is soluble in cyclohexane at 115° C., this experiment showed that highly isotactic polymer can be formed by a solution polymerization.  ᵈ Control.  ᵉ N.D.

A comparison of Example 42 with Examples 34, 36 and 38 illustrates the effect of increasing the concentration of $ZnEt_2$ in the absence of hydrocarbon additive. Molecular weight is decreased as indicated by a decrease in I.V. from 2.0 to 0.60, 0.57 and 0.69, respectively. Crystallinity is also decreased, as shown by a drop in the $$A_{10.02\mu}/A_{10.28\mu}$$

ratio from 0.90 to 0.85, 0.78 and 0.66, respectively. Examples 35, 37 and 39 demonstrate that addition of 0.5 mmole azulene returns the crystallinity to a high value, the $$A_{10.02\mu}/A_{10.28\mu}$$

ratios being 0.98, 0.98 and 0.96, respectively, which is significantly higher than the ratio 0.90 in Example 42. There is some increase in I.V. at the same time, to 0.89, 1.08 and 1.30, but these values all are substantially less than 2.0 in Example 42. It is readily apparent that this invention thus provides a flexible catalyst system which permits production of highly crystalline polypropylenes of desired molecular weight without sacrifice in crystallinity.

It is seen that polypropylene of good crystallinity can be produced even at 115° C according to this invention, e.g., in Examples 47–50. Some increase in molecular weight accompanies these results, but the molecular weight does not exceed that of polymer produced at 80° C. without hydrocarbon additive and is well below polymer produced at conventional temperatures, i.e., 60° C. and below.

Examples 55–67

In a series of experiments, various amounts of azulene, 4,6,8-trimethylazulene, and guaiazulene are added to 100 ml. of heptane solvent, 1 mmol of $\gamma$-$TCl_3$ catalyst, and 4 mmol of $ZnEt_2$. The reaction is carried out for 20 hours at 50° C. The results of these runs are set out in Table 6. In a corresponding control run without additive, the conversion to polymer was 66%, the ratio $$\dfrac{A_{10.02\mu}}{A_{14.28\mu}}$$

was .60, and the I.V. was 1.3 dl./g.

TABLE 6

| Example No. | Additive | Mmole | Change in Percent Conversion | Change in $\dfrac{A_{10.02\mu}}{A_{10.28\mu}}$ | Change in I.V. |
| --- | --- | --- | --- | --- | --- |
| 55 | Azulene | 0.01 | −12 | +0.02 | 0 |
| 56 | do | 0.05 | −39 | +0.20 | +1.2 |
| 57 | do | 0.1 | −40 | +0.30 | +2.2 |
| 58 | do | 0.5 | −26 | +0.34 | +3.0 |
| 59 | do | 1.0 | −20 | +0.36 | +3.6 |
| 60 | do | 0.3 | −18 | +0.35 | +3.7 |
| 61 | do | 14.0 | −25 | +0.37 | +4.7 |
| 62 | 4,6,8-trimethylazulene | 0.01 | −18 | +0.03 | 0 |
| 63 | do | 0.05 | −48 | +0.16 | +0.9 |
| 64 | do | 0.1 | −49 | +0.30 | +1.9 |
| 65 | Guaiazulene | 0.01 | −31 | +0.08 | 0 |
| 66 | do | 0.05 | −39 | +0.13 | +0.7 |
| 67 | do | 0.1 | −39 | +0.22 | +1.7 |

I claim as my invention:

1. An olefin polymerization process which comprises polymerizing alpha-monoolefinic hydrocarbon material to solid, crystallizable polymer by contact, in the presence of hydrocarbon diluent, with a catalyst consisting essentially of the reaction product of a catalytically active compound of a transition metal in a valence state less than its maximum and an organo-metallic compound of a metal selected from the group consisting of aluminum, magnesium, zinc, cadmium, gallium and indium, and of from 0.05 to 1.0 mole, per mole of transition metal compound, of a carbocyclic hydrocarbon selected from the group consisting of (a) dihydrocarbyl fulvenes in which each of the two hydrocarbon substituents has from 1 to 12 carbon atoms and said hydrocarbon substituents are alkyl groups, cycloalkyl groups, alkyl-substituted cycloalkyl groups, phenyl groups or alkyl-substituted phenyl groups; and (b) azulene, and azulene substituted with substituents from the group consisting of alkyl, aryl, haloalkyl and haloaryl groups having from 1 to 12 carbon atoms, unreacted with said organometallic compound.

2. An olefine polymerization process which comprises polymerizing alpha-monoolefinic hydrocarbons of 3 to 22 carbon atoms per molecule to solid, crystallizable polymer by contact, in the presence of a hydrocarbon diluent, with a catalyst consisting essentially of the reaction product of a catalytically active form of titanium trichloride and an organometallic compound selected from the group consisting of aluminum trialkyls, aluminum alkyl halides, zinc dialkyls and mixtures thereof, and of from 0.05 to 1.0 mole, per mole of $TiCl_3$, of a carbocyclic hydrocarbon selected from the group consisting of dimethylfulvene, diphenylfulvene, azulene, 4,6,8-trimethylazulene, and guaiazulene unreacted with said organometallic compound.

3. An olefin polymerization process which comprises polymerizing alpha-monoolefinic hydrocarbons of 3 to 22 carbon atoms per molecule to solid, crystallizable polymer by contact, in the presence of a hydrocarbon diluent, with a catalyst consisting essentially of the reaction product of a catalytically active form of vanadium trichloride and an organometallic compound selected from the group consisting of aluminum trialkyls, aluminum alkyl halides, zinc dialkyls and mixtures thereof, and of from 0.05 to 1.0 mole, per mole of $TiCl_3$, of a carbocyclic hydrocarbon selected from the group consisting of dimethylfulvene, diphenylfulvene, azulene, 4,6,8 - trimethylazulene, and guaiazulene unreacted with said organometallic compound.

4. A process for the polymerization of propylene to stereoregular, crystallizable polymer which comprises contacting propylene in the presence of hydrocarbon diluent at a temperature in the range from 80° to 150° C. with a catalyst consisting of the reaction product of catalytically active titanium trichloride with aluminum dialkyl chloride having from 2 to 10 carbon atoms per alkyl group, and from 0.05 to 1.0 mole, per mole of titanium trichloride, of a carbocylic hydrocarbon selected from the group consisting of dimethylfulvene, diphenylfulvene, azulene, 4,6,8-trimethylazulene, and guaiazulene unreacted with said aluminum dialkyl chloride.

5. A process for the polymerization of propylene to stereoregular, crystallizable polymer of controlled molecular weight, which comprises contacting propylene in the presence of a hydrocarbon diluent at a temperature in the range from 0° to 150° C. with a catalyst comprising the reaction product of a catalytically active compound of a transition metal in a valence state less than its maximum with at least one organometallic compound of a metal from the group consisting of aluminum, magnesium, zinc, cadmium, gallium and indium, said catalyst including at least a dialkyl of a metal from the group consisting of zinc and cadmium, in a ratio of at least 0.5 mole per mole of transition metal compound, together with a sufficient amount, in the range from 0.05 to 1 mole, per mole of transition metal compound, of a hereinafter specified carbocyclic hydrocarbon to result in a polymer having a ratio of infrared absorption $$\frac{A_{10.02\mu}}{A_{10.28\mu}}$$

of at least about 0.90, said carbocyclic compound being selected from the group consisting of dimethylfulvene and diphenylfulvene.

6. An improved polymerization catalyst consisting essentially of the reaction product of one molar part of a catalytically active halide of titanium with from 0.5 to 2 molar parts of an aluminum alkyl compound, and 0.05 to 1 molar part of a carbocyclic hydrocarbon selected from the group consisting of dimethylfulvene and diphenylfulvene.

7. An improved polymerization catalyst consisting essentially of the reaction product of one molar part of a catalytically active halide of vanadium with from 0.5 to 2 molar parts of an aluminum alkyl compound, and 0.05 to 1 molar part of a carbocyclic hydrocarbon selected from the group consisting of dimethylfulvene and diphenylfulvene.

8. The process according to claim 4 wherein said temperature is in the range of 80° to 120° C. and said catalyst consists of the reaction product of one molar part of catalytically active titanium trichloride with 0.5–2 molar parts of aluminum diethyl chloride, and 0.05 to 1 molar part of dimethylfulvene or diphenylfulvene.

9. The process according to claim 4 wherein said temperature is in the range of 80° to 120° C. and said catalyst consists of the reaction product of one molar part of catalytically active titanium trichloride with 0.5–2 molar parts of aluminum diethyl chloride, and 0.05 to 1 molar part of azulene, 4,6,8-trimethylazulene or guaiazulene.

10. A process for the polymerization of propylene to stereoregular, crystallizable polymer of controlled molecular weight, which comprises contacting propylene in the presence of a hydrocarbon diluent at a temperature in the range from 0° to 150° C. with a catalyst comprising the reaction product of a catalytically active compound of a transition metal in a valence state less than its maximum with at least one organometallic compound of a metal from the group consising of aluminum, magnesium, zinc, cadmium, gallium and indium, said catalyst including at least a dialkyl of a metal from the group consisting of zinc and cadmium, in a ratio of at least 0.5 mole per mole of transition metal compound, together with a sufficient amount, in the range from 0.05 to 1 mole, per mole of transition metal compound, of a hereinafter specified carbocyclic hydrocarbon to result in a polymer having a ratio of infrared absorption $$\frac{A_{10.12\mu}}{A_{10.28\mu}}$$

of at least about 0.90, said carbocyclic compound being selected from the formula consisting of azulene, 4,6,8-trimethyl azulene or guaiazulene unreacted with said organometallic compound.

11. An improved polymerization catalyst consisting essentially of the reaction product of one molar part of a catalytically active halide of titanium with from 0.5 to 2 molar parts of an aluminum alkyl compound, and 0.05 to 1 molar part of a carbocyclic hydrocarbon selected from the group consisting of azulene, 4,6,8-trimethyl azulene and guaiazulene unreacted with said aluminum alkyl compound.

12. An improved polymerization catalyst consisting essentially of the reaction product of one molar part of a catalytically active halide of vanadium with from 0.5 to 2 molar parts of an aluminum alkyl compound, and 0.05 to 1 molar part of a carbocyclic hydrocarbon selected from the group consisting of azulene, 4,6,8-trimethyl azulene and guaiazulene unreacted with said aluminum alkyl compound.

References Cited

UNITED STATES PATENTS 3,178,511  10/1966  Langer _____ 260—937
3,119,798  1/1964   Moberly _____ 260—93.7
2,953,553  9/1960   Arnold _____ 260—91.1

FOREIGN PATENTS 851,723  10/1960  Great Britain.

JOSEPH L. SCHOFER, *Primary Examiner.*

M. B. KURTZMAN, *Assistant Examiner.*